May 26, 1936.　　　　E. PUGSLEY　　　　2,042,188
TESTING APPARATUS
Filed Jan. 22, 1934　　　　2 Sheets-Sheet 1

INVENTOR
Edwin Pugsley
BY
Pennie, Davis, Marvin & Edmonds
ATTORNEYS

May 26, 1936.  E. PUGSLEY  2,042,188

TESTING APPARATUS

Filed Jan. 22, 1934  2 Sheets-Sheet 2

Patented May 26, 1936

2,042,188

UNITED STATES PATENT OFFICE 2,042,188

TESTING APPARATUS

Edwin Pugsley, New Haven, Conn., assignor to Winchester Repeating Arms Company, New Haven, Conn., a corporation of Maryland Application January 22, 1934, Serial No. 707,713

7 Claims. (Cl. 161—15)

This invention relates to the testing of human reactions and has for an object the provision of novel testing apparatus which may be employed for scientific or educational purposes or for commercial purposes, as, for example, in the amusement field or in the advertising field.

The apparatus of the invention is designed to test the coordination of the eye and muscles and to measure the speed or rapidity of response and control of a subject.

The apparatus of the invention comprises an electric circuit including an indicating device, switch means for closing said circuit to operate the indicating device, separate switch means under the control of a subject to be tested for controlling the operation of the indicating device, a target and means for causing movement of the target during an indicating period.

In the preferred form of apparatus of the invention, the switch means under the control of the subject to be tested is associated with the trigger of a gun. In the use of the apparatus, the speed and accuracy of a subject in bringing a gun to a firing position, aiming and firing are indicated. In the complete apparatus, the effort of the subject to bring the gun to a firing position and the operation of the indicating device to indicate are commenced substantially simultaneously. Pulling of the trigger by the subject when the gun is in proper firing position controls the operation of the indicating device in such a manner that the time elapsing between the commencement of the effort to bring the gun to a firing position and the instant at which the trigger is pulled can be determined.

Any suitable type of indicating device may be employed and any suitable moving target and target mechanism may be employed.

The preferred apparatus of the invention includes a trap of the type commonly employed for setting in motion or flight target discs or shallow cups of the type commonly referred to as "clay pigeons".

The invention will be better understood from a consideration of the following description in conjunction with the accompanying drawings in which Fig. 1 is a perspective view of a complete apparatus of the invention illustrating its method of use;

Fig. 2 is a plan view of the apparatus shown in Fig. 1;

Fig. 3 is diagrammatic outline of the circuit arrangements of the apparatus of Figs. 1 and 2;

Fig. 4 is an elevation partly in section of a portion of the trap mechanism showing a relay-controlled tripping mechanism associated therewith; and Fig. 5 is a fragmentary view of the tripping mechanism.

Figure 1:
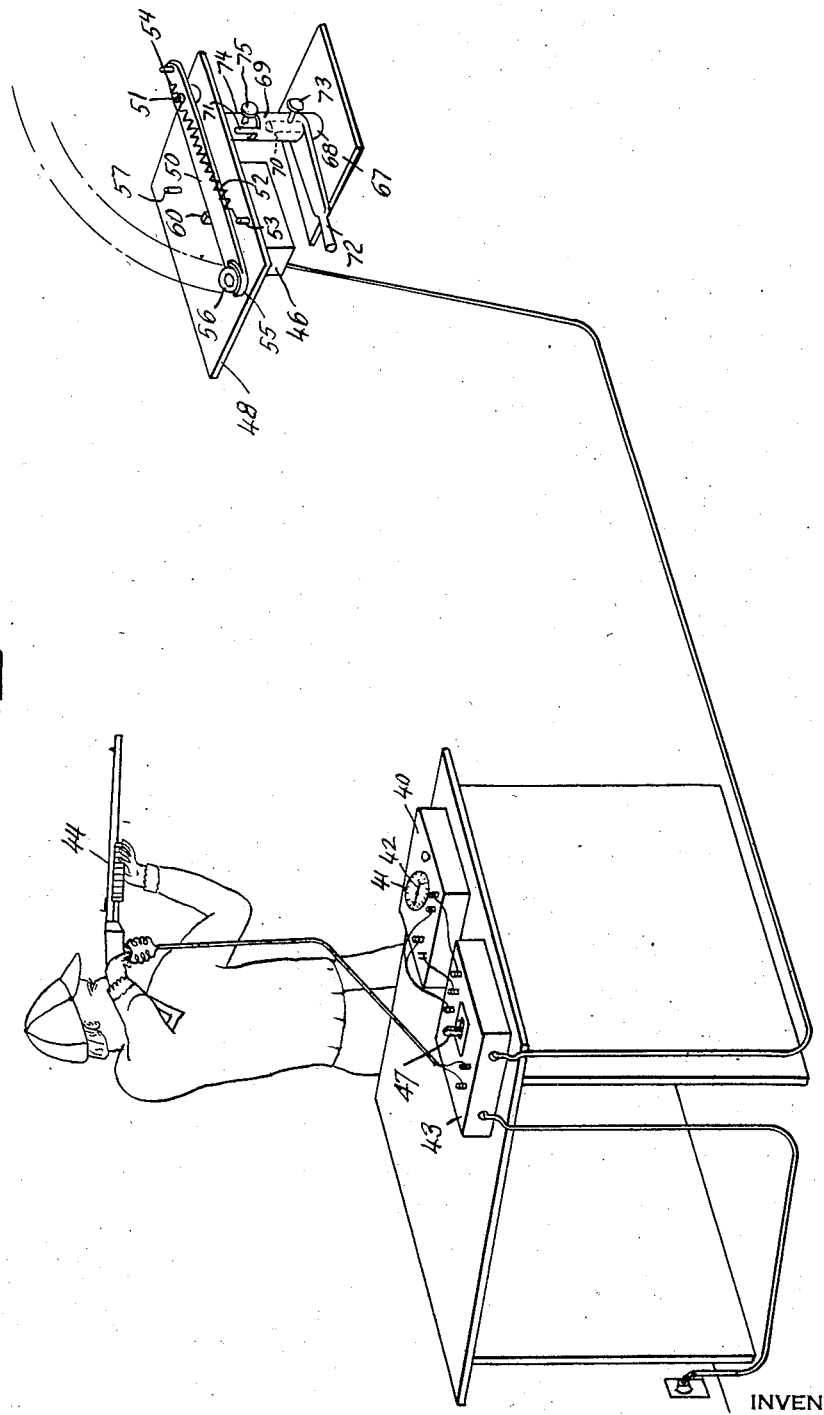

The apparatus shown in the drawings comprises an indicating device 40 of the "Kasson" electrical timer type provided with a stationary scale 41 and an indicating pointer 42 mounted on a vertical shaft (not shown) which may be operatively connected with a clutch and motor shown diagrammatically in Fig. 3.

The clutch and motor are electrically connected through suitable circuit arrangements (shown diagrammatically in Fig. 3) in a control box 43 with a source of supply of electric current.

A gun 44 provided with contact posts 26 and 27 on its trigger guard is electrically connected to a relay within the control box 43 in such a manner as to control the operation of the pointer when the trigger is manipulated.

The contact post 26 is connected in conducting relationship with the metal trigger and trigger guard. The contact element 27 is insulated from the trigger guard but has a conducting portion extending into the path of travel of the trigger.

A relay 46 is electrically connected in circuit with the timer. A control switch 47 is provided for closing the circuit including the relay and the timer.

The relay 46 is associated with a trap mechanism comprising a table 48 having a target throwing mechanism mounted thereon. The throwing mechanism comprises a throwing arm 50 mounted for movement about a vertical axis on a pivot pin 51 which engages the throwing arm at a point between its ends. A helical spring 52 having one end attached to an anchor pin 53 on the upper surface of the table 48 is attached at its other end to a pin 54 rigidly mounted on the throwing arm at one end thereof. The opposite end portion of the throwing arm is provided on its upper surface with a wall 55 which forms a semi-circular recess for the reception of a target 56.

The throwing arm pivot 51 and the helical spring 52 are so arranged that movement of the throwing arm about the pivot 51 in a counter-clockwise direction is resisted by the spring, and, when the force causing the counter-clockwise movement is withdrawn, the arm is moved in a clockwise direction under the influence of the spring. The arrangement is such that when the target receiving end of the throwing arm is disposed adjacent the anchor pin 53, the spring 51 is under tension and the throwing arm is in its cocked or firing position. Suitable means (not shown) may be provided for adjusting the tension of the spring 52. A rigid stop member 57 is mounted on the table 48 with an end portion projecting above the upper surface of the table to limit the throwing movement of the throwing arm.

A latch 60 is provided for locking the throwing arm in its firing or cocked position. The latch 60 is mounted on a horizontal pivot supported by a bracket 61 attached to the lower surface of the table 48. One end portion of the latch is adapted to extend through an opening in the table 48 into the path of travel of the throwing arm. The opposite end portion of the latch is adapted to engage a bar 62 which forms the movable element of the trap relay 46 and which is mounted for vertical sliding movement on a pair of guide rods 63 which depend from and are rigidly attached to the lower surface portion of the table 48.

The lower end portions of the guide rods 63 are reduced in size to fit openings in the opposite end portions of the bar 62. Helical springs 64 are mounted on the reduced end portions of the guide rods below the bar 62, and they are held in position on the rods by means of nuts 65 mounted on the lower ends of the rods. The springs 64 yieldingly resist downward movement of the bar 62. Shoulders formed on the guide rods between the lower reduced end portions and the upper large end portions limit the upward movement of the bar 62.

The arrangement of the latch 60 and the trap relay 46 is such that when the electro-magnet of the relay is deenergized the springs 64 maintain the movable relay element or bar 62 in the path of travel of an end portion of the pivoted latch 60. When the electro-magnet is energized the movable element or bar 62 is moved out of the path of travel of the latch against the action of the springs 64. The trap relay is enclosed in a suitable housing 66.

The table 48 and the throwing mechanism thereon are adjustably mounted on a support comprising a base 67 and a vertical supporting rod 68 having a reduced upper end portion 70. An intermediate supporting element 69 having a recess for the reception of the reduced end portion 70 of the vertical supporting rod 68 in one end and provided at its other end with a flat vertical tongue 71 is mounted for pivotal movement about a vertical axis on the vertical supporting rod 68. An adjusting handle 72 is rigidly attached to the intermediate supporting element 69. A thumb screw 73 is mounted in an opening in the wall of the intermediate section in such a manner that an end may be moved into engagement with the reduced portion 70 of the vertical supporting rod 68 to lock the intermediate supporting section in adjusted position. A bifurcated bracket 74 is rigidly attached to the lower surface portion of the table 48, and its forked end portions engage the tongue 71. A pin 75 extends horizontally through the forked portions of the bracket 74 and through the tongue 71 and provides a horizontal pivot about which the bracket 74 and the table 48 may be tilted.

The electrical circuits of the apparatus are so arranged that, when the switch 47 in the control box 43 is closed, the clutch in the timer connects the pointer shaft with the driving motor, and the pointer starts revolving in a clockwise direction. At the same instant, the electromagnet of the trap relay is energized, and it moves the bar 62 downwardly thus releasing the latch 60 and permitting the commencement of the throwing movement of the throwing arm 50 under the influence of the spring 52. The operation of the latch 60 is illustrated in Fig. 5. The target 56 remains on and moves with the throwing arm until the throwing arm engages the rigid stop member 57, at which instant the target leaves the throwing arm and flies into space.

In the preferred arrangement, the target trap is not visible to the shooter since it is located behind a barrier as a safety precaution against possible injury to a loading attendant stationed at the trap to load fresh targets onto the throwing arm and to cock this arm. The target becomes visible instantly on leaving said trap since the barrier is so located as to just shield the trap in the direction of the shooter. The time required for throwing arm to move and the trap to appear is constant and infinitesimal and hence would be the same for each different shooter.

The throwing of the switch 47 begins the cycle and may be worked by an attendant when the shooter gives the signal, which in practice is given in the customary manner by the shooter calling "pull". Or instead of the shooter calling, the switch may be thrown at the initiative of the attendant, in which case means (not shown) is connected with said switch whereby a suitable signal, either audible or visible is given to inform the shooter of the start of the cycle. At either signal the shooter starts to raise his gun and goes through the operations of pointing it at the flying target, which instantly appears from behind the barrier, draws bead and fires.

When the trigger is pulled, the circuit through the gun is completed, and the relay associated therewith is energized and operates to stop the pointer and deenergize the trap relay 46.

The distance traveled by the pointer during the indicating period is a measure of the subject's reaction time.

When the trap relay is de-energized, the throwing arm may be provided with another target and again moved to its cocked or firing position, and the apparatus may be employed again in a test of a subject. The reloading and setting or cocking of the trap mechanism may be done manually by a trap attendant. The trap attendant may adjust the apparatus as desired to cause the targets to be thrown in various directions and at different angles.

The complete details of operation of the various circuits of the apparatus are as follows:

When the apparatus is plugged in to a source of supply of electric current with the switch 47 open, current flows through the circuit indicated by the numerals 1—2—3—4—5—6—7—8, and the motor in the timer commences to operate. Also, a trickle current flows through the circuit indicated by the numerals 8—7—9—10—11—2—1 to slightly energize the transformer 80, and, in turn, through the circuit indicated by the numerals 21—22—23—24—32—33—29—30—31 to demagnetize the relay 81 if the armature should stick.

When the subject to be tested is in position, the switch 47 is closed and the apparatus operates as follows:

Current flows through the circuit indicated by the numerals 8—7—9—12—13—14—15—16—1 and the trap relay 46 is energized. Simultaneously, current flows through the circuit indicated by the numerals 8—7—9—12—13—14—17—18—19—20—3—2—1, and the clutch is caused to connect the pointer with the motor so that the pointer revolves in a clockwise direction. At the same time, the primary of the transformer 80 is energized by current flowing through the circuit indicated by the numerals 8—7—9—10—11—2—1.

The subject sights the gun on the target 56 and pulls the trigger which causes current to flow through the circuit indicated by the numerals 21—22—23—24—25—28—29—30—31, operating the relay 81 and breaking the circuits in which the trap relay 46 and pointer operating mechanism are included, thus de-energizing the electro-magnet of the trap relay and stopping the pointer. Current flowing through the circuit indicated by the numerals 21—22—23—24—32—33—30—31 holds the relay 81 included therein locked in open position until the switch 47 is opened.

A circuit indicated by the numerals 25—30 and including a one M. F. condenser 82 and 10 ohms resistance 83 in series shunted across the gun circuit is provided to absorb transient inductive kicks.

I claim:

1. Apparatus of the class described comprising a target throwing mechanism, an electric motor, an indicating device, a clutch for operatively connecting the indicating device with the motor, an electric circuit including means for operating the clutch and means for controlling the target throwing mechanism, switch means for closing said circuit to operate the target throwing mechanism and to operate the clutch and cause it to connect the indicating device with the motor, and separate switch means under the control of a subject to be tested for breaking said circuit to operate the clutch and cause it to disconnect the motor and indicating device.

2. Apparatus of the class described comprising a target throwing mechanism, an electric motor, an indicating device, a clutch for operatively connecting the indicating device with the motor, an electric circuit including means for operating the clutch and means for controlling the target throwing mechanism, switch means for closing said circuit to operate the target throwing mechanism and to operate the clutch to cause it to connect the indicating device with the motor, a gun, and switch means mounted on the gun and operable by the manipulation of the trigger, and means controlled by the operation of said switch to break said circuit to operate the clutch and cause it to disconnect the motor and indicating device.

3. Apparatus of the class described comprising an indicating device, target throwing means, an electric circuit, means in said circuit to operate said indicating device and said target throwing means, a gun, switch means mounted on the gun and operable by the manipulation of the trigger and means controlled by the operation of said switch means to stop said indicating device.

4. Apparatus of the class described comprising an indicating device, target throwing means, an electric circuit, means in said circuit to operate said indicating device and said target throwing mechanism, switch means for closing said circuit to operate the indicating device and target throwing means, a gun, switch means mounted on the gun and operable by the manipulation of the trigger, and means controlled by the operation of said switch means to open said circuit and stop said indicating device.

5. Apparatus of the class described comprising a gun, target throwing means, an indicating device, an electric circuit, means in said circuit for controlling the operation of said indicating device and said target throwing means, switch means for closing said circuit to operate the indicating device and the target throwing means, a switch mounted on the gun and operable by the manipulation of the trigger, and means controlled by the operation of said switch to open said circuit and stop the indicating device.

6. Apparatus of the class described comprising an indicating device, target throwing means, an electric circuit, means in said circuit to operate the indicating device, a relay in said circuit to control the operation of said target throwing means, a gun, a switch mounted on the gun and operable by the manipulation of the trigger, and means controlled by the operation of said switch to break said circuit to de-energize said relay and stop the operation of the indicating device.

7. Apparatus of the class described comprising a gun, target throwing mechanism, an indicating device, an electric circuit, means in said circuit for operating said indicating device and said target throwing mechanism, a switch for closing said circuit to cause the operation of said indicating device and target throwing mechanism, a switch mounted on the gun and operable by the manipulation of the trigger, and means controlled by the operation of said switch to stop the indicating device.

EDWIN PUGSLEY.